United States Patent [19]

France et al.

[11] Patent Number: 4,836,643

[45] Date of Patent: Jun. 6, 1989

[54] HALIDE FIBRE WITH HIGH NUMERICAL APERTURE

[75] Inventors: Paul W. France, Newbourn; John R. Williams, Ipswich, both of England

[73] Assignee: British Telecommunications public limited company, United Kingdom

[21] Appl. No.: 151,677

[22] Filed: Feb. 2, 1988

[30] Foreign Application Priority Data

Feb. 16, 1987 [GB] United Kingdom ............... 8703501

[51] Int. Cl.$^4$ .................................................. G02B 6/16
[52] U.S. Cl. .................................. 350/96.34; 350/96.3
[58] Field of Search ............. 350/96.34, 96.33, 96.29, 350/96.31; 65/3.12, 18.2; 501/37

[56] References Cited

U.S. PATENT DOCUMENTS 4,666,247 5/1987 MacChesney et al. .......... 350/96.34

OTHER PUBLICATIONS

*Journal of Lightwave Technology*, vol. LT-3, No. 3, Jun. 1985, pp. 569-573, IEEE, New York, U.S.; H. Tokiwa et al.: "A Core-Clad Composition for Crystallization-Free Fluoride Fibers", Table III, core; table VI, clad.
*Journal of Lightwave Technology*, vol. LT-2, No. 5, Oct. 1984, pp. 566-586, IEEE, New York, U.S.; D.C. Tran et al.: "Heavy Metal Fluoride Glasses and Fibers: A Review", Table 1.
Patent Abstracts of Japan, vol. 10, No. 226 (C-364) [2282], Aug. 7th, 1986; & JP-A-61 63 544 (Kokusai Denshin Denwa Co. Ltd) 01-04-1986.
Chemical Abstracts, vol. 96, No. 10, Mar. 8th, 1982, p. 292, Abstract No. 73413d, Columbus, Ohio, U.S.; M. G. Drexhage et al.: "Fluoride Glasses for Visible to Mid-IR Guided-Wave Optics", & Adv. Ceram. 1981, 2 (phys. fiber Opt.) 57-73.
Chemical Abstracts, vol. 104, No. 4, Jan. 27th, 1986, p. 402, Abstract No. 26632y, Columbus, Ohio, U.S.; H. Tokiwa et al.: "Core-Clad Composition for Ultralow-Loss Fluoride Glass Fibers", & Mater. Sci. Forum 1985, 5 (Halide Glasses, vol. 1) 411-15.
Chemical Abstracts, vol. 97, No. 6, Aug. 9th, 1982, p. 240, Abstract No. 42796X, Columbus, Ohio, U.S.; T. Manabe: "Fluoride Glasses for Infrared Optical Fibers", & Seramikkusu 1982, 17(4), 271-7.

*Primary Examiner*—John D. Lee
*Assistant Examiner*—John Ngo
*Attorney, Agent, or Firm*—Nixon & Vanderhye

[57] ABSTRACT

A high numerical aperture optical fibre, e.g. for use in remote spectroscopy, has a cladding of a halide glass which contains Hf and a core of a halide glass which contains Pb. Preferably both glasses contain $ZrF_4$, $BaF_2$, $LaF_3$, $AlF_3$ and NaF. In addition the cladding contains $HfF_4$ but no $PbF_2$ and the core contains $PbF_2$ but no $HfF_4$.

14 Claims, No Drawings

HALIDE FIBRE WITH HIGH NUMERICAL APERTURE

This invention relates to halide, and particularly fluoride, glass fibers which have a high numerical aperture.

The numerical aperture of a fiber is related to the refractive indices of the core and the cladding and it is given by the formula:

$(NA)^2 = N^2 - n^2$ where
NA = Numerical aperture
N = Refractive index of the core
n = Refractive index of the cladding The reciprocal sine of the numerical aperture, ie $\sin^{-1}(NA)$, gives the angle of acceptance of the fiber, ie the maximum deviation from the normal compatible with the acceptance of radiation for transmission.

There are two important areas of application for optical fibers. These are (a) telecommunications and (b) IR transmission. It is convenient to distinguish between these two applications.

Telecommunications uses digitally modulated light signals to carry information over long distances, eg hundreds of kilometres. Only a small number of carrier frequencies are used simultaneously, in fact the commonest practice uses only one carrier frequency in a fiber. The properties at the carrier frequency (or frequencies) are particularly important, eg attenuations below 0.3 dB/km are desirable Also monomode fibers are used to minimise dispersion. High numerical apertures are of interest to optimise performance in some configurations. Examples of techniques and devices which employ fiber for UV transmission include endoscopes, remote spectroscopy and laser surgery. Conveying radiation to a bit location is also included. Some devices, eg endoscopes, employ an optical cable which comprises a bundle of fibers to collect radiation at a source location and transmit it to a test location. Other techniques, eg laser surgery, use a single fiber.

The input end of a fiber bundle is suitably shaped to accept radiation which impinges thereon. Since it is often impractical, and sometimes impossible, to ensure that a substantial proportion of the radiation impinges normally onto the acceptor surface. It is important that the radiation which impinges at an angle to the normal be accepted for transmission. The acceptance (or otherwise) of the radiation is a property of the individual fiber, rather than the bundle and it depends on the numerical aperture.

In the case of monitoring, the radiation is itself of interest and, therefore, the fiber must be broadband. The distances are much shorter than for telecommunications. Thus there are very few applications where the monitoring is as far as 2 or even as far as 1 km from the source location and instances below 100 m are more typical. There are many applications where distances of only 1-10m are needed. The primary operational requirement is to collect enough radiation energy for monitoring or sensing and this requires a bundle of multimode fibers (whereas telecommunications requires a single monomode fiber). Attenuation losses should be taken into account in assessing the size of the bundle. Thus satisfactory monitoring performance may be obtained with attenuations as high as 1000 db/km, especially for very short ranges.

The importance of the bundle size to collect enough radiation has already been mentioned. Since it is the cores which play the major part it is the total core size which is important. Where space is limited it may be important to minimise the amount of cladding subject to the condition that substantial leakage should not occur. Thus the cladding should be at least 10 micrometers, preferably 15 micrometers, thick. The overall fiber diameters are suitably 50 to 400 micrometers. Fibres in which the core accounts for 10% to 90%, preferably 40% to 60%, of the cross sectioned area of each fiber are particularly convenient.

Thus the required properties of an optical fiber for these applications include:

(1) High numerical aperture. A high numerical aperture is the primary property. The value should be above 0.05 preferably above 0.2, and, if possible, above 0.25

(2) Low attenuation. The attenuation is over the wave length band of the intended use. There is a particular requirement for telecommunications fibers usable at wavelengths of 0.5 to 4.5 micrometers. In this band fluoride fibers, eg fibers based on $ZrF_4$, are particularly suitable. The Journal of Lightwave Technology (Volume LT-3, Number 3 of June 1985) at pages 569 to 572 discusses fluoride fibers for telecommunications.

(3) Compatability. Obtaining a good fiber depends on more than selecting two low-loss glasses, ie one of high and one of low refractive index. The glasses have to be compatible with one another and, in particular, they must be compatible during the stage of drawing a preform to the fiber.

There are major problems in selecting a pair of glasses to conform to all three points mentioned above. Compatibility suggests selecting glasses with similar chemical compositions, but a high numerical aperture requires different compositions. GB 2,164,032A recommends using NaF and $HfF_3$ to produce the difference in NA but it advises against the use of $PbF_2$ because scattering may occur.

The Journal of Lightwave Technology, vol LT-3 no. 3 of June 1985 at pages 569 to 573 publishes a paper which discusses a core - clad composition for crystallization-free fluoride fibers. The paper considers LiF-$PbF_2$ and NaF-Pb $F_2$ combinations. It recommends the use of glass fibers in which some of the $ZrF_4$ in the core is replaced by $HfF_4$ in the cladding.

It has now, most surprisingly, been discovered that the requirements for high numerical aperture fiber are achieved in halide, e.g. fluoride glass fibers, by replacing Hf halide in the cladding by Pb halide in the core. In preferred embodiments the cladding glass contains a halide of Hf and preferably no Pb and the core glass contains a halide of Pb and preferably no Hf.

Apart from the Hf and Pb, the two glasses preferably have similar compositions, eg both contain halides of Zr, Ba, La, Al and Na.

The invention, which is more fully defined in the claims, includes not only individual fibers but also bundles comprised of the fibers. Bundles and cables incorporating fibers with different compositions may be used to increase the effective bandwidth.

A fiber according to the invention will now be described by way of example.

A cladding having a refractive index of 1.493 at 589nm was prepared by weighing the following ingredients:

|  | Mole % |
| --- | --- |
| $ZrF_4$ | 39.7 |
| $BaF_2$ | 18.0 |
| $LaF_3$ | 4.0 |
| $AlF_3$ | 3.0 |
| NaF | 22.0 |
| HfF | 13.3 |
| Total | 100.0 |

These ingredients were melted at 900° C. under an atmosphere of pure $N_2 + O_2$ and cast to a hollow cylinder of dimensions:

| length | 12 cm |
| --- | --- |
| external diameter | 10 mm |
| bore diameter | 7 mm |

A core glass composition having a refractive index 1.508 at 589nm was prepared by weighing the following ingredients:

|  | mole % |
| --- | --- |
| $ZrF_4$ | 51.5 |
| $BaF_2$ | 19.5 |
| $LaF_3$ | 4.7 |
| $AlF_3$ | 3.3 |
| NaF | 18.0 |
| $PbF_2$ | 3.0 |
| TOTAL | 100.0 |

After melting as described above, this composition was cast into the bore of the hollow cylinder to obtain a fiber preform. This preform was drawn in conventional manner to yield 700 m of fiber.

| Diameter (micrometers) | 100 |
| --- | --- |
| Core % (area) | 50 |
| Numerical aperture at 589 nm | 0.21 |
| Attenuation (dB/km) at: |  |
| 1200 nm | 30 |
| 1600 nm | 18 |
| 2000 nm | 12 |
| 2400 nm | 9 |
| 2600 nm (min) | 7 |

Some of the properties of this fiber are given below:
The numerical aperture of 0.21 corresponds to an angle of acceptance of about 12°.

Ideally the glass compositions should contain only the ingredients specified. In practice small amounts of impurities may be present. Cross-contamination of Pb and Hf is regarded as impurity and the main effect of such cross-contamination is to reduce the numerical aperture.

A second sample of fiber was prepared using the same technique of casting and drawing a preform. The constitution of the second sample was:

|  | CORE | CLADDING |
| --- | --- | --- |
| $ZnF_4$ | 51.54% | 39.70% |
| $BaF_2$ | 17.54% | 20.00% |
| $LaF_3$ | 4.70% | 4.00% |
| $AlF_3$ | 3.21% | 3.00% |
| NaF | 20.00% | 20.00% |
| $PbF_2$ | 3.01% | NONE |
| $HfF_4$ | NONE | 13.30% |
| DIAMETER | 125μ | 175μ |

(Note. The percentages are molar).

Some properties of the fiber were:

| Core % (area) | 51 |
| --- | --- |
| Numerical Aperture at 589 nm | 0.21 |
| Breaking Strain | 2% |
| Attenuation (dB/km) at: |  |
| 3200 nm | 40 |
| 2600 nm (min) | 21.2 |
| 1500 nm | 34 |

(The breaking strain was the median strength measured by a two point bend test).

What is claimed is:

1. An optical fiber having a numerical aperture of at least 0.05 measured at wavelength 589nm which comprises a halide cladding glass which contains a halide of Hf and a halide core glass which contains a halide of Pb, the amount of hafnium halide in the cladding glass being at least 3% mole greater than the amount in the core glass and the amount of lead halide in the core glass being at least 0.5% mole greater than the amount in the cladding glass.

2. An optical fiber according to claim 1, wherein all the halides are fluorides.

3. An optical fiber according to claim 2, wherein both cladding and core glass comprise fluorides of Zr, Ba, La, Al and Na.

4. An optical fiber as in claim 2 having substantially no halide of Hf in the core glass and substantially no halide of Pb in the cladding glass.

5. An endoscope which comprises a plurality of fibers according to claim 1.

6. A fiber cable for radiation monitoring wherein every fiber comprised in the cable is a fiber according to claim 1.

7. An optical fiber as in claim 1 having substantially no halide of Hf in the core glass and substantially no halide of Pb in the cladding glass.

8. A fiber according to claim 1, wherein the external diameter is between 50 to 400 micrometers, the cross-sectional area of core is between 10% and 90% of the cross-sectional area of the whole fiber, and the cladding is at least 15 micrometers thick.

9. An optical fiber having a numerical aperture of at least 0.05 measured at wavelength 589nm which comprises a fluoride cladding glass and a fluoride core glass, wherein the two glasses have the compositions:

| Compound | Cladding (mole %) | Core (mole %) |
| --- | --- | --- |
| $ZrF_4$ | a | T |
| $BaF_2$ | b | U |
| $LaF_3$ | c | V |
| $AlF_3$ | d | W |
| NaF | e | X |
| $HfF_4$ | f | Y |
| $PbF_2$ | g | Z | wherein each of the following expressions lies within the range specified:

| $45 < a + f < 55$ | $45 < T + Z < 55$ | $3 < f - Y < 55$ |
| --- | --- | --- |
| $15 < b < 25$ | $15 < U < 25$ | $0.5 < Z - g < 8$ |
| $3 < c < 6$ | $3 < V < 6$ |  |
| $2 < d < 5$ | $2 < W < 5$ |  |

-continued

| | | | | |
|---|---|---|---|---|
| 15 < e | < 30 | 10 < X | < 25 | |
| 3 < f | < 55 | 0.5 < Z | < 10 | |

10. An optical fiber according to claim 9, wherein each of the following expressions lies within the range specified:

| Min. | | | | Max. |
|---|---|---|---|---|
| 10 | < | f − Y | < | 15 |
| 1 | < | Z − g | < | 5 |

11. An optical fiber according to claim 9, wherein the modulus of each of the expressions (a+f−T−Y), (b−U), (c−V) and (d−W) is less than 5.

12. An optical fiber according to claim 11, wherein the modulii of (a+f+T−Y), (b−U), (c−V) and (d-W) are all less than 2.

13. An optical fiber according to claim 9, wherein Y is less than 1 and g is less than 0.1

14. An optical fiber according to claim 13, wherein Y and g are both substantially equal to zero.

* * * * *